United States Patent
Beekmann et al.

(10) Patent No.: US 10,132,294 B2
(45) Date of Patent: Nov. 20, 2018

(54) METHOD FOR FEEDING ELECTRIC POWER INTO A SUPPLY GRID

(71) Applicant: Wobben Properties GmbH, Aurich (DE)

(72) Inventors: Alfred Beekmann, Wiesmoor (DE); Kai Busker, Großefehn (DE)

(73) Assignee: Wobben Properties GmbH, Aurich (DE)

( * ) Notice: Subject to any disclaimer, the term of this patent is extended or adjusted under 35 U.S.C. 154(b) by 89 days.

(21) Appl. No.: 14/911,700

(22) PCT Filed: Aug. 1, 2014

(86) PCT No.: PCT/EP2014/066615
§ 371 (c)(1),
(2) Date: Feb. 11, 2016

(87) PCT Pub. No.: WO2015/022206
PCT Pub. Date: Feb. 19, 2015

(65) Prior Publication Data
US 2016/0201651 A1   Jul. 14, 2016

(30) Foreign Application Priority Data
Aug. 15, 2013  (DE) .................. 10 2013 216 241

(51) Int. Cl.
*H02J 1/10* (2006.01)
*F03D 7/04* (2006.01)
(Continued)

(52) U.S. Cl.
CPC .............. *F03D 7/048* (2013.01); *F03D 9/257* (2017.02); *H02J 3/12* (2013.01); *H02J 3/18* (2013.01);
(Continued)

(58) Field of Classification Search
CPC ..... H02J 1/10; H02J 1/102; H02J 7/35; Y02E 60/12; G06F 1/26
(Continued)

(56) References Cited

U.S. PATENT DOCUMENTS

| 7,606,638 | B2 | 10/2009 | Fortmann et al. |
| 7,638,893 | B2 | 12/2009 | Wobben |

(Continued)

FOREIGN PATENT DOCUMENTS

| CN | 101640419 A | 2/2010 |
| DE | 102004060943 A1 | 7/2006 |

(Continued)

OTHER PUBLICATIONS

Vasquez et al., "Adaptive Droop Control Applied to Voltage-Source Inverters Operating in Grid-Connected and Islanded Modes," *IEEE Transactions on Industrial Electronics* 56(10):4088-4096, 2009.

*Primary Examiner* — Quan Tra
(74) *Attorney, Agent, or Firm* — Seed IP Law Group LLP

(57) ABSTRACT

Method for feeding electric power into an electric supply grid by means of a wind farm, wherein the wind farm feeds into the supply grid from an interconnecting network and via a transformer, with the first interconnecting network having a interconnecting network voltage and the supply grid having a grid voltage, wherein feeding takes place based on a virtual measured voltage and a voltage of a virtual measurement point is calculated as the virtual measured voltage.

10 Claims, 5 Drawing Sheets

(51) Int. Cl.
*H02J 3/38* (2006.01)
*H02J 3/12* (2006.01)
*H02J 3/18* (2006.01)
*F03D 9/25* (2016.01)

(52) U.S. Cl.
CPC ............. *H02J 3/386* (2013.01); *Y02E 10/763* (2013.01); *Y02E 40/30* (2013.01)

(58) Field of Classification Search
USPC .......................................................... 307/43
See application file for complete search history.

(56) References Cited

U.S. PATENT DOCUMENTS

| | | | |
|---|---|---|---|
| 7,839,024 B2 | 11/2010 | Cardinal et al. | |
| 7,840,312 B2 | 11/2010 | Altemark et al. | |
| 8,588,987 B2 | 11/2013 | Riesberg et al. | |
| 8,981,708 B2 | 3/2015 | Diedrichs et al. | |
| 9,257,843 B2* | 2/2016 | Egedal | H02J 3/16 |
| 9,279,411 B2 | 3/2016 | Beekmann et al. | |
| 9,362,837 B2 | 6/2016 | Diedrichs et al. | |
| 9,680,607 B2* | 6/2017 | Nammi | H04L 1/0073 |
| 2007/0233406 A1 | 10/2007 | Delmerico | |
| 2010/0138061 A1* | 6/2010 | Walling | H02J 3/383 |
| | | | 700/287 |
| 2010/0332042 A1 | 12/2010 | Riesberg et al. | |
| 2012/0136494 A1 | 5/2012 | Kirchner et al. | |
| 2013/0300118 A1* | 11/2013 | Bech | H02J 3/381 |
| | | | 290/44 |
| 2014/0254216 A1 | 9/2014 | Diedrichs et al. | |

FOREIGN PATENT DOCUMENTS

| | | |
|---|---|---|
| DE | 102009030725 A1 | 12/2010 |
| DE | 102010006142 A1 | 8/2011 |
| DE | 102011084910 A1 | 4/2013 |
| EP | 2551984 A2 | 1/2013 |
| EP | 2607690 A1 | 6/2013 |
| EP | 2806523 A2 | 11/2014 |
| JP | 2009-239990 A | 10/2009 |
| JP | 2011-234620 A | 11/2011 |
| RU | 2011142739 A | 4/2013 |
| WO | 2010036974 A2 | 4/2010 |

* cited by examiner

METHOD FOR FEEDING ELECTRIC POWER INTO A SUPPLY GRID

BACKGROUND

Technical Field

The present invention relates to a method for feeding electric power into an electric supply grid by means of a wind farm. The present invention moreover relates to a wind farm performing such method or prepared for performing such method.

Description of the Related Art

It is common knowledge to feed electric power into a supply grid by means of a wind farm. The basic concept here is a wind farm, as shown schematically in FIG. 2 that comprises several wind power installations according to the schematic illustration of FIG. 1.

Such a wind farm is also known to be used for supporting the supply grid into which it feeds electric power. This means that a wind farm is not only operated such as to feed maximum power into the supply grid (so-called parallel power generation), but also to possibly adapt its feeding in terms of type and amount so as to support the supply grid. Such a method is known, for example, from U.S. Pat. No. 7,638,893.

Nowadays, wind farms are increasingly also used for grid support purposes. Although this trend is generally a positive one, there is a risk that many feeding and grid-stabilizing wind farms in a supply grid could work against each other in an unfavorable constellation, which could result in a vibration behavior. Such risk exists basically also in relation to other decentralized generators within the supply grid that want to contribute to stabilization.

The German Patent and Trademark Office has researched the following prior art in the priority application: DE 10 2009 030 725 A1, EP 1 802 866 B1 and EP 2 551 984 A2.

BRIEF SUMMARY

One or more embodiments are directed to increasing the stability or at least maintaining the stability of an electric supply grid. At least one alternative solution should be proposed.

In accordance with one embodiment of the invention is a method that includes using a wind farm to feed electric power into an electric supply grid. The wind farm feeds such power into the supply grid from an interconnecting network and via a transformer. The interconnecting network has a interconnecting network voltage and the supply grid has a grid voltage. The interconnecting network may also be, for example, a wind farm grid connecting the wind power installations of the wind farm. The transformer may be the feeding point or may be arranged at the feeding point via which the wind farm feeds into the electric supply grid.

Feeding is based on a virtual measured voltage. During feeding, said virtual measured voltage is thus referenced—at least for some aspects. A voltage of a virtual measurement point is calculated as the virtual measured voltage. A virtual measurement point is thus specified that is located preferably in a line of the supply grid, in a line of the interconnecting network or in the transformer, and the voltage at such virtual measurement point is calculated by knowing the topology.

Measuring thus takes place at one point, for example in the interconnecting network at the transformer. What is moreover specified is a virtual measurement point that may be located, in particular, at a desired point in the supply grid or at a desired point in the transformer. The virtual measurement point may also lie in a connecting line between the transformer and the supply grid. A voltage at the virtual measurement point is then calculated from the values measured at the actual measurement point, which constitutes the virtual voltage. The thus calculated virtual measured voltage is then taken as a basis for feeding electric power into the supply grid.

In this way, the voltage is recorded at a desired point, namely at the virtual measurement point. One advantage of proceeding like this is that at least a partial decoupling of the actual voltage metering takes place. The virtual, i.e., calculated voltage depends less on other feeders. Problems that may be caused by even only minimum errors of measurement, especially in connection with I-term controllers, are thus avoided.

In the aforementioned example, a measurement can be taken in the interconnecting network, i.e., for example, in the wind farm grid, and a voltage value can be nonetheless taken as a basis at a desired place in the supply grid. Incidentally, an option proposed for each described embodiment is that the supply grid is a wind farm grid.

According to one embodiment, it is proposed that the virtual measurement point lie in the transformer. What can be anticipated there, in particular, is a stable voltage value for this approach. Feeding can be referenced to this stable voltage value, which will increase the feeding stability and thus also the stability of the supply grid. In particular, such virtual measurement point in the transformer will not be used by another wind farm. In this way, one can prevent, for example, two wind farms from wanting to control the voltage at an identical point or at least at an identical place and thus from working against each other. What is thus prevented is these two exemplary wind farms working against each other when controlling the same voltage.

Preferably, the wind farm feeds from a medium-voltage grid into a high-voltage grid, meaning that the interconnecting network is a medium-voltage grid and thus that the interconnecting network voltage is a medium voltage and the supply grid a high-voltage grid, which means that the grid voltage is a high voltage. This means that when feeding into said high-voltage grid, the wind farm hence acts at a comparatively high grid level. The range of feeding to this high grid level is correspondingly great.

Here, high voltage lies mostly at 110 kV, however this value may be defined differently from country to country. Medium voltage lies approximately within a range between 1 and 50 kV. This definition, too, may vary from country to country.

According to one embodiment, it is proposed that the virtual measurement point in the transformer be set to a predetermined rated value. Preferably, this value may be around 20 kV.

When measuring for example in a 20 kV grid and the transformer boosts to 110 kV, the virtual voltage is calculated relative to the measured voltage. For example, the virtual voltage could be calculated from the measured voltage 20.2 kV, plus a voltage difference, namely, for example, as a calculation of the virtual transformer tapping of 0.7 kV. In this example, the virtual voltage is hence 20.9 kV. A voltage controller used in this case now operates at a virtual voltage of 20.9 kV and a rated voltage in the aforementioned example of 20 kV.

According to one embodiment, the virtual measured voltage at the virtual measurement point is calculated from a measured voltage, the currently fed-in power and the currently fed-in reactive power, considering the respective resistance and the respective reactance lying between the actual measurement point and the virtual measurement point.

Depending on the selected virtual measurement point, this may also be the resistance and the reactance of a line lying between the actual measurement point and the virtual measurement point. What possibly need to be added are the resistance and reactance of the transformer. It may suffice to consider only the resistance or only the reactance if either one of the two can be disregarded.

However, other values, such as a current of the transformer, from which it may be possible to derive the power and/or reactive power, may also be considered as measured values, in addition or alone.

Incidentally, during measurement and calculation one may take an effective value as a basis. Preferably, however, one will use a complex value at least for the measured voltage and/or the calculated virtual voltage, i.e., a voltage value by amount and phase. If and insofar as the current is considered, such current may also be considered as a complex value, i.e., by amount and phase. In this way, it may be possible to determine the active and reactive power. Please note that fed-in power means fed-in active power here.

According to one embodiment, it is proposed that the fed-in power and/or the fed-in reactive power change based on the virtual measured voltage. What is hence proposed is a voltage-dependent power control and/or a voltage-dependent reactive power control that refers to the virtual measured voltage.

What is moreover proposed is a wind farm that feeds in, or is prepared for feeding in, electric power into a supply grid according to at least one of the above-described embodiments. Such preparation includes, in particular, that the wind farm comprises a corresponding control unit that controls the feeding of power at a feeding point, in particular at the transformer, and/or that can evaluate corresponding measured values for a measured voltage and possibly fed-in active and reactive power. What is provided in addition or alternatively is this or yet another control unit or computing unit that can calculate the virtual measured voltage. Such control unit, in particular a farm control unit, comprises, in particular, a corresponding microprocessor.

BRIEF DESCRIPTION OF THE SEVERAL VIEWS OF THE DRAWINGS

The invention is described in greater detail below, using embodiments as examples with reference to the accompanying figures.

DETAILED DESCRIPTION

Figure 1:
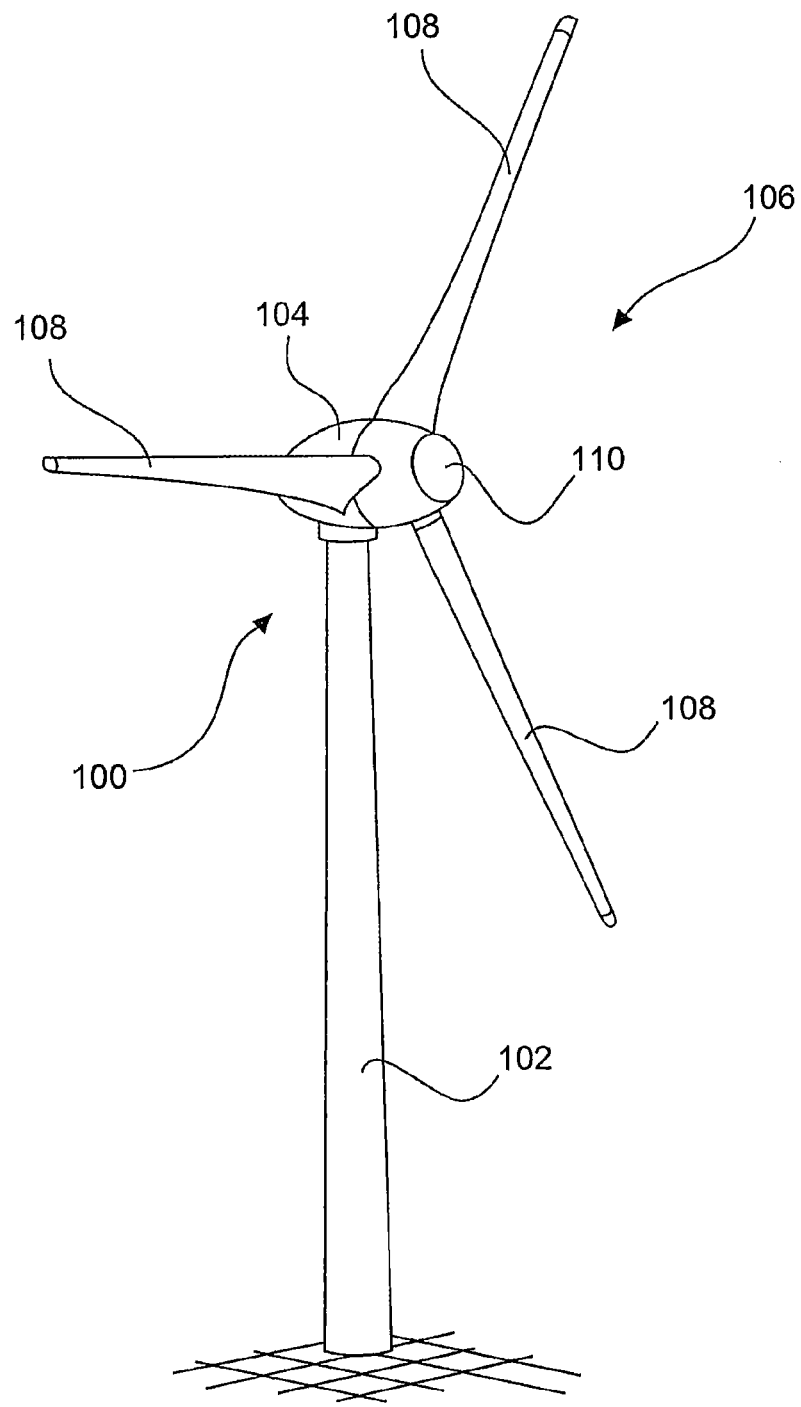
FIG. 1 shows the schematic perspective view of a wind power installation.

FIG. 1 shows a wind turbine 100 with a tower 102 and nacelle 104. A rotor 106 with three rotor blades 108 and a spinner 110 is located on the nacelle 104. When in operation, the rotor 106 is brought to a rotating movement by the wind and thereby drives a generator in the nacelle 104.

Figure 2:
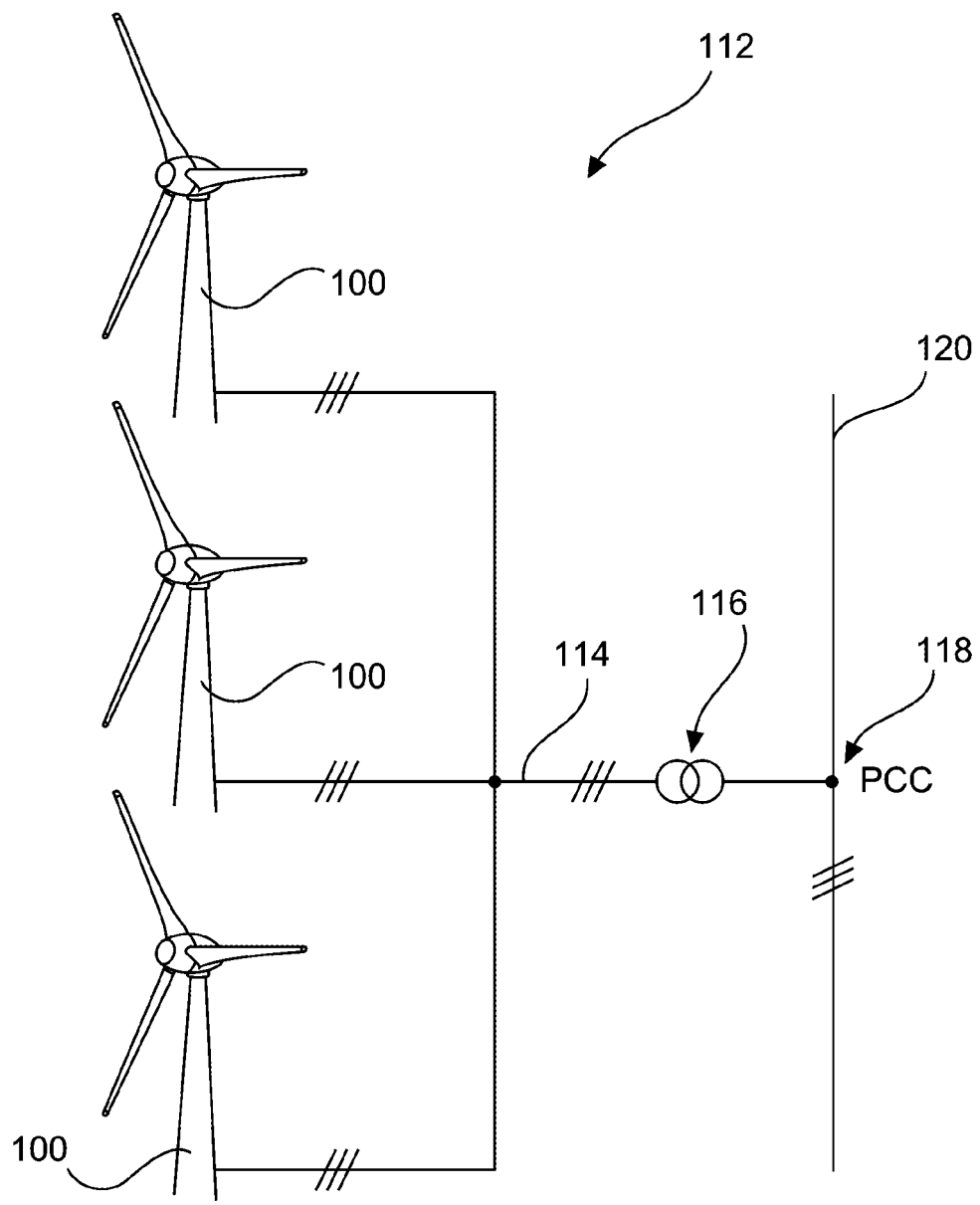
FIG. 2 shows the schematic view of a wind farm.

FIG. 2 shows a wind farm 112 with, for example, three wind power installations 100, which may be the same or different. The three wind power installations 100 are thus representative of a basically random number of wind power installations of a wind farm 112. The wind power installations 100 provide their power, in particular the generated electricity, via an electric wind farm grid 114. The currents or powers, respectively, generated by the individual wind power installations 100 are added up. Most often, a transformer 116 will be provided, which transports the voltage at the wind farm to then feed it into the supply grid 120 at the feeding point 118, which is also generally referred to as a PCC. FIG. 2 is merely a simplified illustration of a wind farm 112, which does not show, for example, a control, although a control exists, of course. Also, the wind farm grid 114 may be designed differently, including, for example, a transformer at the output of each wind power installation 100, to mention just one other embodiment.

Figure 3:
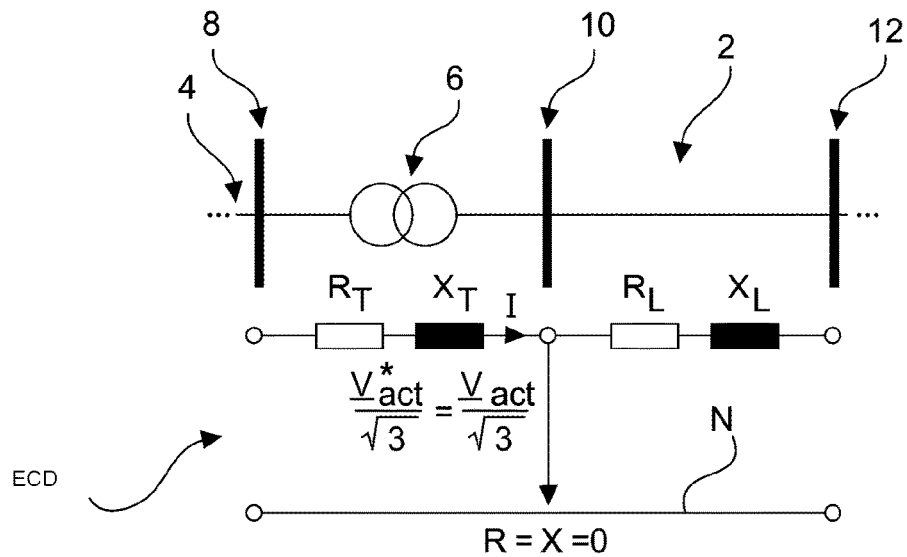
FIGS. 3 and 4 each schematically show part of a supply grid, including a point of common connection and an equivalent circuit diagram.

In its upper portion, FIG. 3 shows a section of a grid with a feeding point, namely an electric supply grid 2, an adumbrated interconnecting network 4 and a transformer 6 for stepping up an electric voltage in interconnecting network 4, i.e., a interconnecting network voltage, to a voltage in the supply grid 2, i.e., a grid voltage. What is furthermore adumbrated are three measuring points or measurement points, namely a wind farm measuring point 8, a grid measuring point 10 and a virtual measurement point 12. The wind farm measuring point 8, which may also be referred to as wind farm measurement point, is arranged directly before the transformer 6 in the interconnecting network 4, which also forms the wind farm grid 4 in this case. The grid measuring point 10, which may also be referred to as grid measurement point, is arranged directly at transformer 6 in the supply grid 2. From the perspective of the wind farm grid or interconnecting network 4, grid measuring point 10 is thus arranged behind transformer 6. The virtual measurement point 12 is basically arranged at a random point in the supply grid 4, in particular at a clear distance to the grid measuring point 10. The virtual measurement point is a point in the supply grid at a position where the electric voltage is of importance, in particular for an adjustment control that relies thereon. FIG. 3—and also FIG. 4—show the virtual measurement point 12 in the supply grid 2. However, the virtual measurement point could also be located in the transformer 6.

The grid measuring point 10 or the transformer 6 as such may be referred to as point of common coupling (PCC).

FIG. 3 moreover shows an equivalent circuit diagram ECD in addition to the depicted grid section, incl. feeding point. Resistance $R_T$ and reactance $X_T$ constitute the replacement components for the transformer 6. The replacement components $R_L$ and $X_L$ represent the characteristics of the supply grid 2 for the section between the grid measuring point 10 and the virtual measurement point 12. The grid measuring point 10 shows a current line voltage $\underline{V}_{act}$, which in the equivalent circuit diagram ECD is indicated as phase voltage $\underline{V}_{act}/\sqrt{3}$ against the neutral conductor N. What is moreover flowing is a current $\underline{I}$. This means that complex values are used here for current and voltage. FIG. 3 shows the case where the virtual measurement point corresponds to the actual measurement point, namely to the grid measuring point 10 in this case. Here, the virtual measured voltage is specified as $\underline{V}^*_{act}$. Since the measured voltage and the virtual voltage are identical here, the following applies:

$\underline{V}^*_{act} = \underline{V}_{act}$

Mathematically speaking, this can be expressed such that the replacement values R and X have the value 0:

$$R = X = 0.$$

Figure 4:
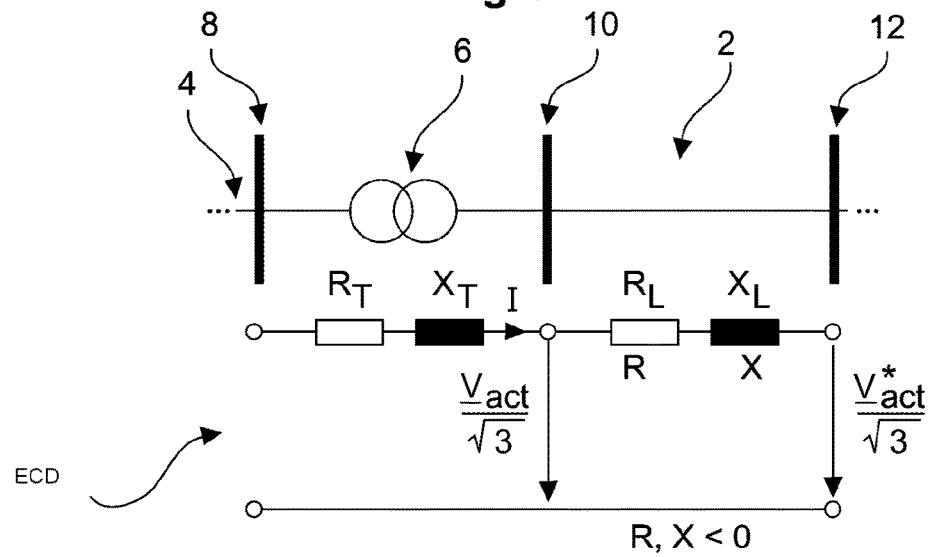

FIG. 4 shows the case where the virtual measurement point 12 is arranged at a clear distance to the grid measuring point 10 in the supply grid 2. In this case, the virtual voltage $\underline{V}^*_{act}$ can be calculated from the measured voltage $\underline{V}_{act}$ with the aid of resistance $R_L$ and reactance $X_L$ of the supply grid 2. In the calculation, these parameters of the equivalent circuit diagram ECD of the supply grid 2 are used without index for the sake of convenience reasons. In the following equation, R and X thus describe the resistance or reactance of the supply grid 2 between the grid measuring point 10 and the virtual measurement point 12. The value of the virtual measured voltage $V^*_{act}$ is thus calculated according to the following equation:

$$V^*_{act} = |\underline{V}_{act} + \sqrt{3} \cdot (R + jX) \cdot \underline{I}| = \sqrt{\left(V_{act} + R \cdot \frac{P_{act}}{V_{act}} + X \cdot \frac{Q_{act}}{V_{act}}\right)^2 + \left(X \cdot \frac{P_{act}}{V_{act}} - R \cdot \frac{Q_{act}}{V_{act}}\right)^2}$$

The virtual measured voltage $V^*_{act}$ is thus calculated from the resistance and the reactance R and X and from the line current $\underline{I}$. To this end, the line current $\underline{I}$ may also be subdivided into real and imaginary portions and can be calculated from the current active power $P_{act}$, the fed-in reactive power $Q_{act}$ and the currently measured line voltage $V_{act}$:

$$\mathrm{Re}(\underline{I}) = \frac{P_{act}}{V_{act}}; \mathrm{Im}(\underline{I}) = \frac{Q_{act}}{V_{act}}$$

The above calculation formula for calculating the virtual voltage $V^*_{act}$ thus assumes that the resistance R and the reactance X are not 0 but smaller than 0, because their effects are compensated for in the calculation of the virtual measured voltage $V^*_{act}$.

For the current calculation, the values—in particular the parameters for resistance R and reactance X—can be used in normalized form. The impedance $Z_{Base}$, for example, which is calculated according to the following formula from the rated voltage $V_{rat}$ and the rated active power $P_{rat}$ that is to be fed in, can be used as a reference parameter or basic parameter for scaling purposes:

$$Z_{Base} = \frac{V_{rat}^2}{P_{rat}}.$$

The virtual measured voltage $\underline{V}^*_{act}$ can be thus determined for the virtual measurement point 12.

According to another embodiment, it is proposed for the virtual measurement point 12 to lie in the transformer 6. The virtual measured voltage $\underline{V}^*_{act}$ can be then calculated analogously, as above, for the virtual measurement point 12 in the supply grid 2, wherein the resistance R' and the reactance X' must be used for the respective portion, i.e., for the respective coil portion of the transformer 6.

The values for the resistance R or R' and for the reactance X or X' can be determined based on measurements or based on knowledge of the underlying topology. These values could also be calculated from measured values, in particular for a virtual measurement point in the transformer.

Figure 5:
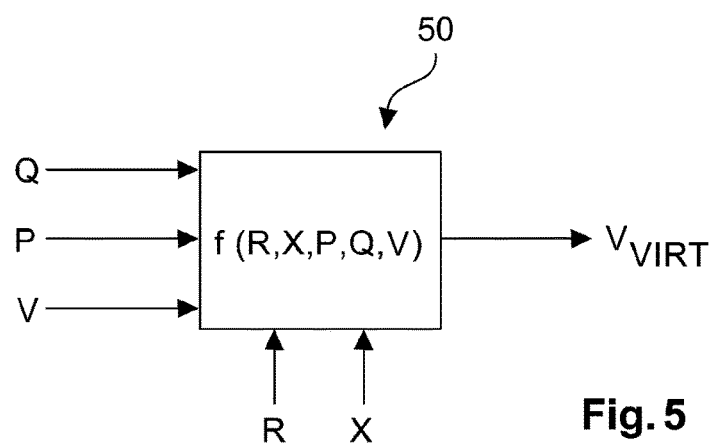
FIG. 5 shows a calculation operator for illustrating the calculation of a virtual voltage.

FIG. 5 shows how the virtual measured voltage $V_{VIRT}$ is calculated based on a function block 50. Said function block 50 requires as an input parameter the respective resistance R and the respective reactance X and as measured values for the reference point or measurement point the currently fed-in reactive power Q, the currently fed-in active power P and the currently applied voltage V. In general terms, the virtual measured voltage $V_{VIRT}$ is then a function of these two parameters and of these three measured values:

$$V_{VIRT} = f(R, X, P, Q, V).$$

The thus calculated virtual voltage $V_{VIRT}$ can be used as an ACTUAL value for a voltage control, which receives a reference voltage $V_{ref}$ as its target value and calculates therefrom a manipulated variable, namely in particular a reactive current that is to be fed in.

Figure 6:
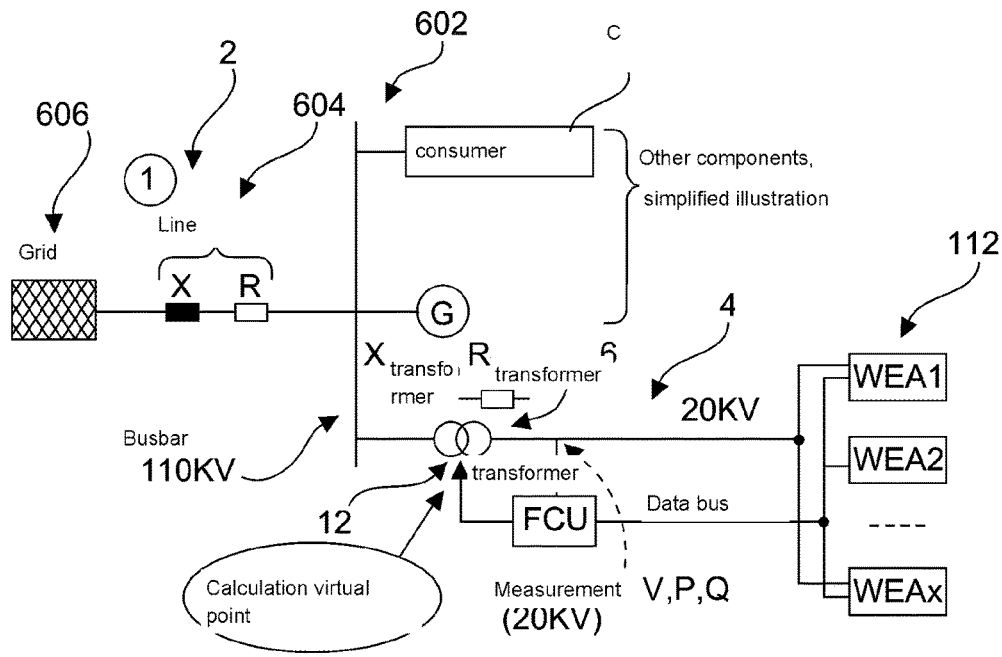
FIGS. 6 through 8 show three possible constellations of a connected wind farm with different virtual measurement points.
Figure 7:
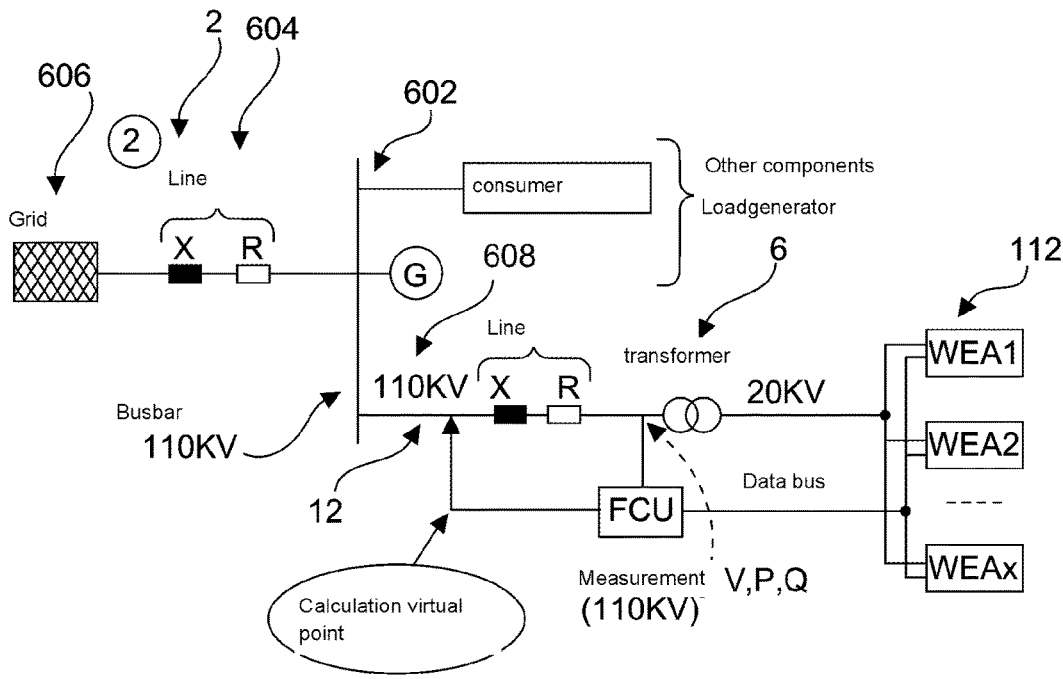
Figure 8:
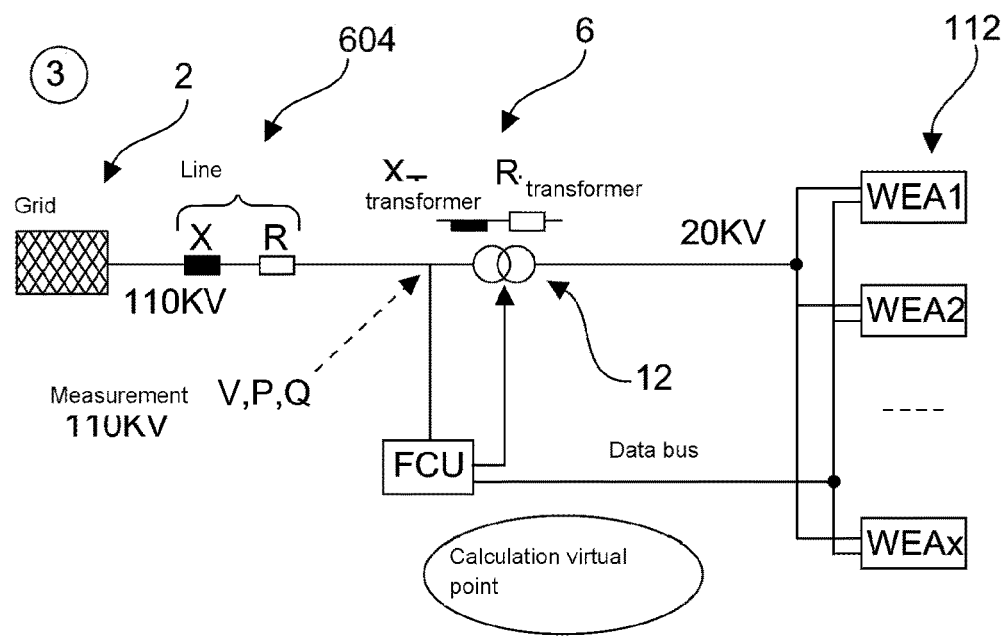

FIGS. 6 through 8 show different constellations for a wind farm connection, including the proposed virtual voltage metering. Pursuant to FIG. 6, a central farm control unit FCU carries out measurements in the interconnecting network 4 before the transformer 6, from the perspective of the wind farm 112. Here, the virtual measurement point 12 lies in the transformer 6. When it comes to the calculation of the virtual voltage, the transformer may also be described essentially by the adumbrated equivalent circuit diagram from the series connection of the inductive portion $X_{transformer}$ and the ohmic portion $R_{transformer}$.

What is of particular importance in the constellation shown is a local section 602 of the electric supply grid 2 that comprises a generator G and a consumer C, which represent various components. The local section 602 is finally connected to a remaining section 606 of the supply grid 2 via a line 604.

The setup pursuant to FIG. 7 corresponds to that of FIG. 6, wherein the virtual measurement point 12 lies in the area of a connecting line 608 that lies between the transformer 6 and the local section 602 of the electric supply grid 2. Here, the connecting line 608 is dominant, at least not negligible, so that the virtual measurement point 12 can be selected here, as shown. Measuring by means of the farm control unit FCU takes place behind the transformer 6, in relation to the wind farm 112.

Pursuant to the constellation of FIG. 8, no local section 602 is provided for—at least it is not shown as being crucial. Here, the virtual measurement point 12 lies in the transformer 6, and measuring takes place by means of the farm control unit FCU behind the transformer 6 and before a line 604, from the perspective of the wind farm 112, which line forms a connection to the supply grid 2 or to the remaining or farther away section 606 of the supply grid 2.

FIGS. 6 through 8 thus show that the virtual measurement point may lie either in the transformer or at a position of a line, depending on the concrete present topology. Also, actual measuring can take place either before or behind the transformer, as seen from the perspective of the wind farm. In any event, the virtual voltage is calculated based on a measurement, wherein, in particular, a fed-in current—in particular reactive current—is considered for this calculation.

It is thus proposed to calculate a virtual voltage in the supply grid with the aid of a compensation of a drop in voltage at a conductor and/or other components in the grid. What is proposed, in particular, according to one embodiment, is to calculate a virtual voltage in a transformer in this manner. The advantage is that a corresponding decoupling of the actual voltage metering takes place.

For calculation purposes, compensation requires an indication of the resistance and reactance that is to be compensated. What is further considered are the values measured at the respective measuring point. The result is the voltage at the virtual measurement point. This is the point where adjustment control takes place, i.e., in particular, the adjustment control of feeding, including any grid support measures, is based on this voltage at the virtual point or on this virtual voltage.

What is thus proposed is a solution where voltage metering is decoupled. The line voltage of the wind farm is not influenced merely by said wind farm, but may also be influenced by other generators or consumers that are connected at the same or at a nearby grid point.

If in this situation several units, i.e., in particular, several wind farms, perform a voltage control in respect of said grid point, in particular with a PI controller or PID controller, this may lead to control-induced instability. This may be due to the fact that each of these units measures a slightly different line voltage. This deviation may be caused by the tolerances of measuring, which, in turn, may depend on the measuring device used from time to time, on different measuring methods or on converter cores with tolerances, to name just a few examples.

Now, if every controller, i.e., the respective controller of the units, tries to control said voltage, this may lead to problems caused, in particular, by the integral term (I-term). Sooner or later, the integral term will integrate every ever-so-slight deviation to a significant value.

To address this problem, it is proposed, in particular, to decouple the measured line voltage in any suitable form. To this end, it is proposed to use of a virtual measurement point. The calculation of the virtual measurement point, i.e., the voltage in the virtual measurement point, is done by the electric calculation of a line or transformer. What is assumed here is this component, i.e., the line or transformer, as ohmic inductive components. The corresponding formula has already been provided above for calculating the virtual measured voltage $V^*_{act}$.

Now, by using the virtual measurement point, i.e., the voltage calculated thereto, one no longer uses the actual voltage metering as the actual value for adjustment control, but an addition of the actual voltage and the drop in voltage of the ohmic inductive component, i.e., of the transformer or line. This drop in voltage is calculated accordingly from the parameters for R and X based on the fed-in current I of the wind farm, i.e., based on the current flowing through the corresponding component.

For example, if more reactive current is now fed in as a result of such voltage control, this will affect the actual voltage and, at the same time, also the drop in voltage via the line or transformer. As a result, the real actual voltage measurement is partly decoupled.

The virtual voltage is thus a function that depends on the values Vactual, Pactual and Qactual. With such converted (virtual) voltage, it is now possible to use, in particular, a PI voltage controller.

The invention claimed is:

1. A method for feeding electric power into an electric supply grid by a wind farm, the method comprising:
   from an interconnecting network and via a transformer, feeding the electric power from the wind farm into the supply grid, the interconnecting network having an interconnecting network voltage and the supply grid having a grid voltage, wherein:
   feeding is based on a virtual measured voltage, and
   a voltage of a virtual measurement point is calculated as the virtual measured voltage,
   wherein the virtual measurement point is arranged in the transformer, the transformer including coils, wherein:
   one part of the coils of the transformer is active at the virtual measurement point and an electric position of the measurement point is defined by a ratio of a number of active coils to a total number of the coils of the transformer,
   a resistance and a reactance of the active coils are taken as parameters to calculate the virtual measured voltage at the virtual measurement point, and
   values for the resistance and the reactance of the active coils are calculated from a resistance and a reactance of the transformer and from a ratio of the number of active coils to the total number of the coils of the transformer.

2. The method according to claim 1, wherein the virtual measurement point:
   lies in a line of the supply grid,
   lies in a line of the interconnecting network, or
   lies in a conductor between the transformer and the supply grid.

3. The method according to claim 1, wherein the virtual measurement point lies in the transformer.

4. The method according to claim 1, wherein at least one of the following:
   the grid voltage is approximately 110 kV; and
   the interconnecting network voltage is between 1 kV and 50 kV.

5. The method according to claim 1, wherein:
   the virtual measured voltage at the virtual measurement point is calculated from at least one or more of the following:
   the interconnecting network voltage,
   a current of the transformer,
   the currently fed-in power, and
   a currently fed-in reactive power, and
   the calculation of the voltage of the virtual measurement point is based on at least one of the following:
   a resistance of at least a portion of the transformer or a line between an actual measurement point and the virtual measurement point, and
   a reactance of at least a portion of the transformer or a line between an actual measurement point and the virtual measurement point.

6. The method according to claim 1, wherein:
   the fed-in power is increased or reduced, and
   a fed-in reactive power is increased or reduced based on the virtual measured voltage.

7. A wind farm for feeding electric power into a supply grid, wherein the wind farm is prepared for using a method according to claim 1 for feeding the electric power into the supply grid.

8. The method according to claim 1, wherein the virtual measurement point is set to a predetermined rated value.

9. The method according to claim 8, wherein the predetermined rated value is 20 kV.

10. The method according to claim 1, comprising:
    measuring a voltage at an actual measurement point that is a distance away from the virtual measurement point; and
    calculating the virtual measured voltage based on the voltage at the actual measurement point.

* * * * *